United States Patent
Krone et al.

(10) Patent No.: US 6,594,979 B2
(45) Date of Patent: Jul. 22, 2003

(54) SELF-PROPELLED AGRICULTURAL HARVESTING MACHINE

(75) Inventors: Bernard Krone, Spelle (DE); Josef Horstmann, Ibbenburen (DE)

(73) Assignee: Maschinenfabrik Bernard Krone GmbH, Spelle (DE)

( * ) Notice: Subject to any disclaimer, the term of this patent is extended or adjusted under 35 U.S.C. 154(b) by 19 days.

(21) Appl. No.: 10/064,420

(22) Filed: Jul. 11, 2002

(65) Prior Publication Data

US 2003/0010004 A1 Jan. 16, 2003

(30) Foreign Application Priority Data

Jul. 13, 2001 (DE) .......................... 101 34 137

(51) Int. Cl.$^7$ ........................ A01D 75/28; G06F 19/00
(52) U.S. Cl. ................... 56/10.26; 56/10.2 R; 56/219; 460/114; 701/50
(58) Field of Search ............... 460/23, 114, 115, 460/119; 56/16.4 R, 16.6, 10.2 R, 219, 208, 10.26; 701/50

(56) References Cited

U.S. PATENT DOCUMENTS

| | | | | |
|---|---|---|---|---|
| 4,296,409 A | * | 10/1981 | Whitaker et al. | 340/684 |
| 4,463,546 A | * | 8/1984 | Day | 56/364 |
| 4,970,849 A | * | 11/1990 | Friesen | 56/12.4 |
| 5,749,783 A | * | 5/1998 | Pollklas | 460/119 |
| 6,012,272 A | * | 1/2000 | Dillon | 56/14.6 |
| 6,125,818 A | * | 10/2000 | Okamoto et al. | 123/305 |
| 6,128,574 A | * | 10/2000 | Diekhans | 701/209 |
| 6,233,911 B1 | * | 5/2001 | Dillon | 56/14.6 |
| 6,339,917 B1 | * | 1/2002 | Dillon et al. | 56/14.6 |

FOREIGN PATENT DOCUMENTS

DE      200 234     3/1983

* cited by examiner

*Primary Examiner*—Thomas B. Will
*Assistant Examiner*—Nathan Mammen
(74) *Attorney, Agent, or Firm*—Gudrun E. Huckett

(57) ABSTRACT

A self-propelled harvesting machine has an attachment for picking up cut crop or for harvesting stalked crop and a processing device for chopping the crop. A curved spout is arranged downstream of the processing device for picking up the crop at a pick-up location and transferring it to a drop location on a transport vehicle. A control device adjusts an operating speed of the drive motor to idle speed, nominal speed, and a speed range below the nominal speed. The drive motor, when the attachment has a great working width and the distance between pick-up location and drop location of the curved spout has a great length, is operated at nominal speed and, when the attachment has a minimal working width and the distance between pick-up location and drop location of the curved spout has a minimal length, is operated at a reduced speed.

6 Claims, 2 Drawing Sheets

SELF-PROPELLED AGRICULTURAL HARVESTING MACHINE

BACKGROUND OF INVENTION

1. Field of the Invention

The invention relates to a self-propelled agricultural harvesting machine, in particular, a self-propelled field chopper, with an attachment or implement for picking up cut crop lying on a field or grassland, such as grass/hay or green forage, or for harvesting corn, and similar stalked crop, in the field. The harvesting machine comprises a processing device for chopping and/or processing the harvested crop and an unloading device arranged downstream thereof and formed substantially of a curved unloading spout for picking up the harvested crop from the processing device at a pick-up location and for transferring the harvested crop to a drop location on a transport vehicle. The harvesting machine also has a drive device embodied as a drive motor whose operating speed is adjustable by a control device to an idle speed or nominal speed.

2. Description of the Related Art

Such agricultural harvesting machines are employed in combination with different attachments for harvesting grass/hay as well as for harvesting corn. The drive action is generally realized by means of a drive motor in the form of an internal combustion engine whose operating speed can be adjusted either to idle speed or a nominal so that the drive motor of the self-propelled agricultural harvesting machine can be operated only with the nominal speed when working.

A self-propelled agricultural harvesting machine is described in German Democratic Republic patent document DD 200 234. A controlled adjustment is said to be obtained according to a current load situation by reducing the operating speed of the drive motor used during working when transporting the device because the transport of the device requires a reduced power in comparison to its working situation. For this purpose, the speed of the drive motor is reduced for the transport to a constant value below the nominal speed so that the drive motor operates within a more favorable range with reduced fuel consumption. The speed reduction is to be initiated by an impulse which is generated when switching on the transport gear. However, the self-propelled agricultural harvesting machine will be operated over the course of its service life and use predominantly in the working state, i.e., at nominal speed, so that the fuel savings during transport of the harvesting machine relative to the total fuel consumption during the entire service life and use will constitute only a fraction of the total. Of much greater importance in this connection is the configuration and operation of the self-propelled agricultural harvesting machine with different attachments or implements.

For harvesting grass, the self-propelled agricultural harvesting machine is provided with an attachment or implement for picking up crop stalks, such as grass/hay and green forage, laid in swaths, wherein the working width of the attachment or implement is configured such that transport of the self-propelled agricultural harvesting machine with the implement attached is still within legal limits. This means that the width of the implement matches thus approximately the transportation width limit of self-propelled agricultural harvesting machines on public roads.

In order to obtain an acceptable output per surface unit when harvesting corn (maize), it is necessary to provide the self-propelled agricultural harvesting machine within an implement whose working width corresponds at least to a multiple of the transportation width limit of the harvesting machine on public roads. Based on this, different lateral lengths or distances result during operation of the harvesting machine between the self-propelled agricultural harvesting machine and a transport vehicle driving adjacent thereto; the transport vehicle serves for receiving and transporting the chopped harvested crop.

For ensuring a loss-free transfer of the harvested crop, the unloading device, in the form of a curved spout, is configured, as a function of the width of the attachment or implement, to have different lengths between a pick-up location, where the unloading device picks up the harvested crop from a processing device of the self-propelled agricultural harvesting machine, and a drop location of the harvested crop on a transport vehicle driving next to the harvesting machine. In practice, it was found that in the case of self-propelled agricultural harvesting machines, which are designed, based on their maximum installed motor power, for use with an implement with a large working width (corn or maize harvesting attachment) and a long spout, the maximum drive power provided by the drive motor cannot be utilized in the case of an attachment with smaller working width for cutting grass and a short spout so that in this way a portion of the provided drive power remains unused and the self-propelled agricultural harvesting machine cannot be used in an economical way when used for harvesting grass.

SUMMARY OF INVENTION

It is an object of the present invention to overcome the disadvantages of the prior art and to configure a self-propelled agricultural harvesting machine such that an economical use can be achieved for the different power levels required for harvesting grass/hay or corn.

In accordance with the present invention, this is achieved in that the drive motor, during operation of the harvesting machine with an implement of a large working width and with a great distance between the pick-up location and the drop location of the curved spout, is operated in the range of the nominal speed and, during operation with an implement with minimal working width and with a minimal distance between the pick-up location and the drop location of the curved spout, is operated in a speed range which is reduced relative to the nominal speed.

In a self-propelled agricultural harvesting machine according to the invention, it is proposed, for optimizing the ratio between the usable motor power and the fuel consumption required for the useable motor power in the case of harvesting grass as well as harvesting corn, to operate the drive motor of the self-propelled agricultural harvesting machine in the range of the nominal speed during operation with an attachment of a great working width (several times greater than the transport width of the harvesting machine) and a great distance between the pick-up location and the drop location of the curved spout, while the drive motor can be operated in a speed range which is reduced relative to the nominal speed during operation with an attachment of minimal working width and a minimal distance between the pick-up location and the drop location of the curved spout. In this way, it is achieved according to the invention that the self-propelled agricultural harvesting machine, in particular, a self-propelled field chopper, can be operated at maximum power of the drive motor when harvesting corn while the drive motor can be operated at a reduced speed in an operating state with reduced motor power for harvesting grass. As can be seen in power curves of drive motors, in this range the specific fuel consumption drops also so that in this way the absolute fuel consumption, which is calculated based on the specific fuel consumption and the motor power consumed at this operating point, can be significantly lowered. The driver/operator of the self-propelled agricultural harvesting machine can therefore utilize the harvesting machine under optimal economical conditions even for harvesting grass.

According to a simple and thus cost-beneficial embodiment of the invention it is proposed that a control device, provided for setting the operating speed of the drive motor of the self-propelled agricultural harvesting machine during operation, is formed by a switching device which serves for adjusting the motor speed to idle speed or the nominal speed and for adjusting at least one speed reduced relative to the nominal speed. This means that the driver/operator of the self-propelled agricultural harvesting machine can select by actuation of a switching device—preferably an electric or electronic device—the operating speed based on the employed implement and the distance between the pick-up location of the harvested crop from a processing device and the drop location of the harvested goods onto the transport vehicle so that the harvesting machine is operated under optimal conditions for harvesting grass as well as corn.

According to a further advantageous aspect of the invention it is conceivable to embody the control device for setting the operating speed of the drive motor such that the reduction of the motor speed is carried out as a function of the distance between the pick-up location of the harvesting crop from the processing device into the curved spout and the drop location of the harvested crop onto the transport vehicle. For this purpose, sensors (sensing means) can be provided which detect this distance and transmit it to the control device so that an automatic controlled reduction of the operating speed relative to the nominal speed can be achieved. Preferably, the area of the reduced speed can be within a range of approximately 75% to 85% of the nominal speed.

DETAILED DESCRIPTION

Figure 1:
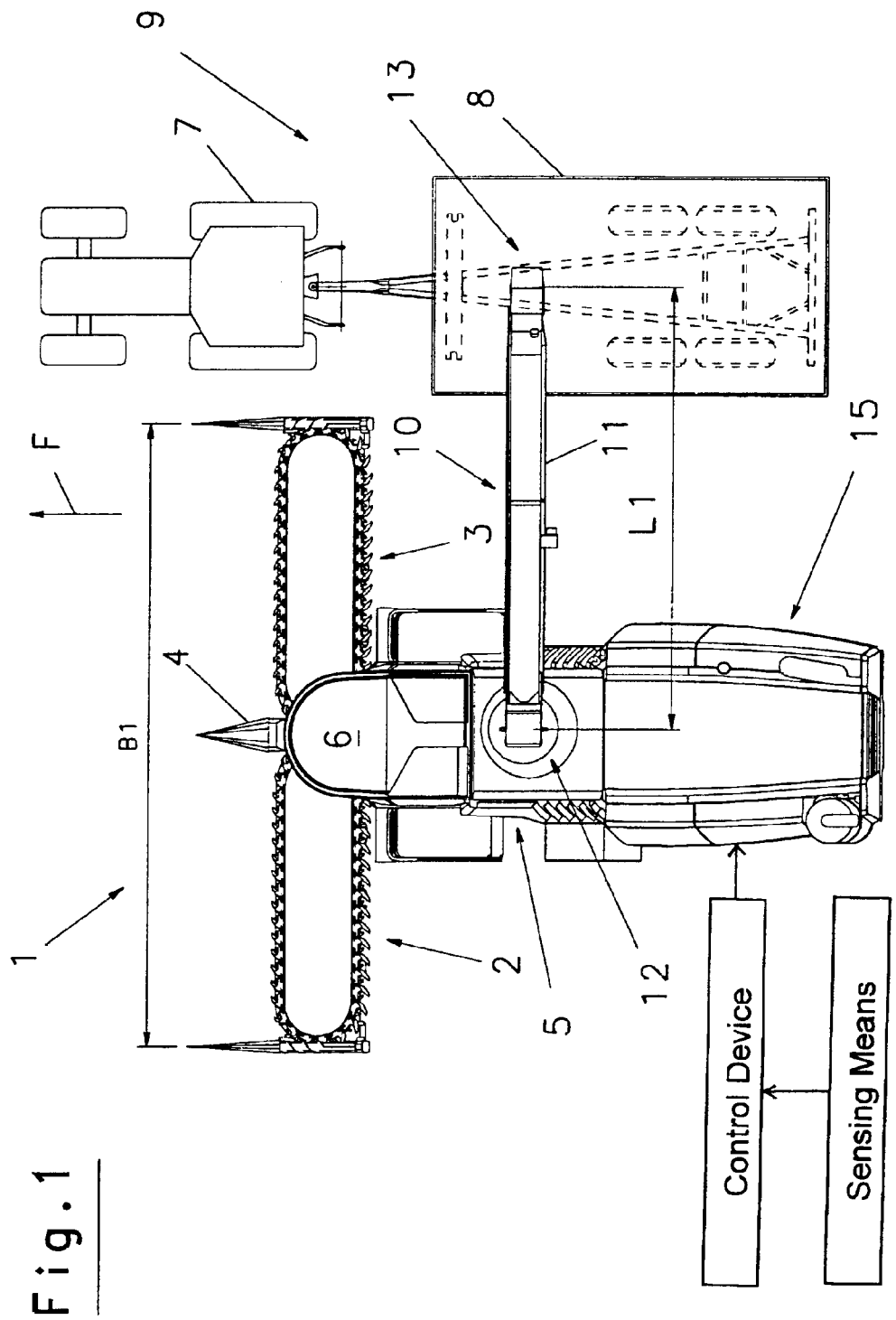
FIG. 1 is a schematic plan view onto a field chopper with a first embodiment of an attachment and a transport vehicle driving next to the chopper during operation.

A first embodiment of a self-propelled agricultural harvesting machine, in particular, a field chopper with an attachment or implement 1 for row-independent harvesting of stalked crop in the field, such as corn or the like, is illustrated in detail in FIG. 1 and is comprised of at least one, preferably two (as illustrated) intake and conveying devices 2, 3 aligned with their longest extension transverse to the driving and working direction F. They are arranged adjacent to one another such that a continuous harvesting swath of a great working width can be harvested. A central divider tip 4 is positioned between the intake and conveying devices 2, 3 for dividing and guiding the crop swath to be harvested to the intake and conveying devices 2, 3. For suspending the implement 1 on the self-propelled agricultural harvesting machine, support means (not illustrated) are provided so that the intake and conveying devices 2, 3 can be transferred from the working and operating position illustrated in FIG. 1 into a transport position in which the intake and conveying devices 2, 3 are in a substantially vertically aligned (upwardly folded) position providing a minimal transportation width.

A processing device 5 for chopping the supplied harvested crop is positioned downstream of the attachment or implement 1 and arranged underneath the operator cabin 6. For transferring the harvested crop chopped or processed by the processing device 5 onto a transport vehicle 9, moving adjacent to the harvesting machine and comprised of an agricultural tractor 7 and a trailer 8, an unloading device 10 is provided which is embodied as a curved spout 11 and picks up the harvested crop at a pick-up location 12 from the processing device 5 and conveys it to a drop location 13 within the cargo space of the trailer 8.

During this transfer the curved spout 11 is generally aligned approximately transversely to the driving and working direction F because the driver/operator has the best view of the cargo space in this position for controlling and regulating the loading state of the trailer 8. As a result of the great working width B1 of the implement 1 a great distance between the harvesting machine and the trailer 8 results so that for ensuring a loss-free transfer of the harvested crop from the harvesting machine to the trailer 8 a curved spout 11 is required which has a great length L1 between the pick-up location 12 and the drop location 13.

Figure 2:
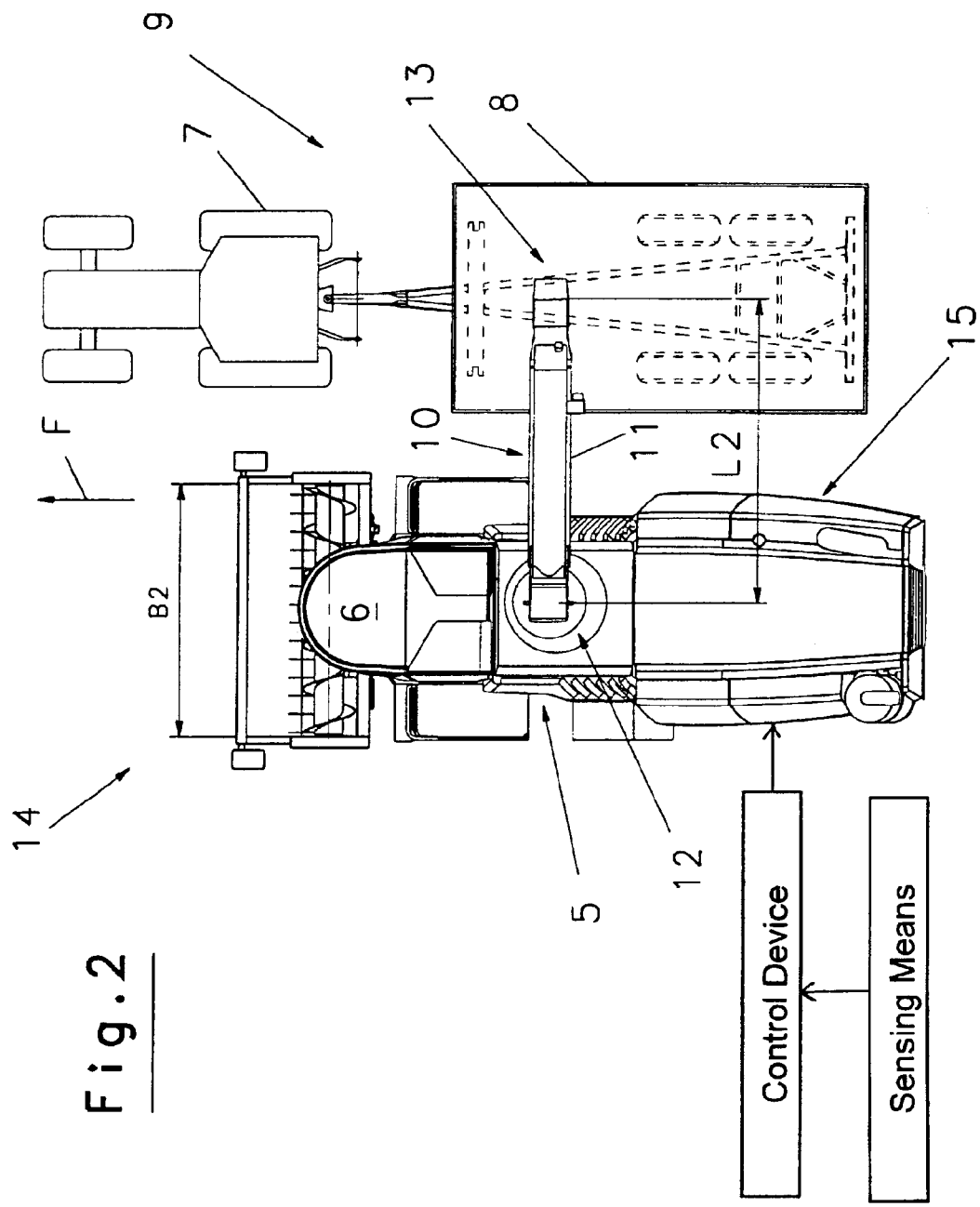
FIG. 2 is a schematic plan view onto a field chopper with a second embodiment of an attachment and a transport vehicle driving next to the chopper during operation.

In FIG. 2 the harvesting machine is provided with an attachment or implement 14 for picking up crop stalks or crop leaves, such as hay or green forage, laid in swaths on a field or grassland. The implement 14 has a minimal working width B2 which approximately matches the maximum transportation width limit on public roads. In this way, the lateral distance between the harvesting machine and the transport vehicle 9, comprised of an agricultural tractor 7 and a trailer 8, corresponding to the length L2 between the pick-up location 12 and the drop location 13 for performing a loss-free transfer of the harvested crop from the harvesting machine to the trailer 8, becomes smaller also.

The different lengths of the curved spout 11 and the different lengths or spacings L1, L2 between the pick-up location 12 and the drop location 13 can be realized in that an extension pipe is inserted into or removed from the upper, approximately horizontally extending section of the curved spout 11. However, it is also conceivable that the upper, approximately horizontally extending section of the curved spout 11 comprises a telescoping pipe element so that by means of a push/pull control member a continuous change of the length (L1 to L2 or vice versa) between the pickup location 12 and the drop location 13 can be initiated.

For driving the harvesting machine according to FIGS. 1 and 2, a drive motor 15 is provided which is arranged in the rear portion of the harvesting machine and, in an embodiment of the harvesting machine according to FIG. 1, is operated during operation in the range of the nominal speed, i.e., in the range of maximal motor power, while in an embodiment of the harvesting machine according to FIG. 2 the drive motor can be operated at a speed which is reduced relative to the nominal speed. In this way, it is ensured, on the one hand, that for a large working width B1 of the attachment or implement 1 and a great length L1 a loss-free transfer takes place which does not lead to any clogging risk of the curved spout 11 as a result of a too small conveying output of the unloading device 10 which output depends on the operating speed of the drive motor 15. On the other hand, during operation of the harvesting machine with reduced operating speed of the drive motor with an attachment or implement 14 having a small working width B2, it is prevented that, as a result of a too great conveying output of the unloading device 10, the harvested crop is conveyed across and past the trailer 8 or that the harvested crop, in particular, in the case of trailers 8 that are filled half or higher, is transported or conveyed so strongly into the cargo space of the trailer 8 that the movement direction is reversed and the harvested crop is thrown across the sidewalls of the trailer 8 back onto the field. Moreover, the reduction of the operating speed of the drive motor 15 enables that the self-propelled agricultural harvesting machine can be used also for harvesting grass/hay under optimal economical conditions.

In a simple embodiment of the invention, it is provided that a control device for setting the operational speed of the drive motor 15 of the self-propelled agricultural harvesting machine during operation is comprised of a switching device with switching positions for idle speed, nominal speed, and at least one intermediate position for a speed reduced relative to the nominal speed. The switching device serves for adjusting the speed to the idle speed or the nominal speed and for adjusting at least one speed reduced relative to the nominal speed. This means that the driver/operator of the self-propelled agricultural harvesting machine can select by actuation of a preferably electric or electronic switching device the operating speed corresponding to the employed implement or attachment 1 or 14 and the length L1 or L2 between the pick-up location 12 of the harvested crop from a processing device 5 and the drop location 13 of the harvested crop onto the transport vehicle 9. For this purpose, the switching device can be arranged within the driver cabin 6.

According to a further advantageous embodiment of the invention, it is possible configure the control device for setting the operational speed of the drive motor 15 such that the reduction of the speed is carried out as a function of the length L1 or L2 between the pick-up location 12 of the harvested crop from the processing device 5 into the curved spout 11 and the drop location 13 of the harvested crop onto the transport device 9. For this purpose, sensing means or sensor(s) can be provided which measure this length L1 or L2 and transmit the measured values to the control device so that an automatic controlled reduction of the operating speed relative to the nominal speed can be achieved.

While specific embodiments of the invention have been shown and described in detail to illustrate the inventive principles, it will be understood that the invention may be embodied otherwise without departing from such principles.

What is claimed is:

1. A self-propelled agricultural harvesting machine comprising:

a first attachment having a first working width for harvesting stalked crop standing in a field and a second attachment having a second working width for picking up cut crop lying on a field, wherein the first and second attachments are used alternatively;

a processing device for chopping or processing the crop;

an unloading device arranged downstream of the processing device and comprised substantially of a curved spout for picking up the crop from the processing device at a pick-up location and for transferring the crop to a drop location on a transport vehicle spaced at a distance from the pick-up location;

a drive motor; and a control device configured to adjust an operating speed of the drive motor to an idle speed, a nominal speed, and a speed range below the nominal speed, wherein the drive motor, when the first attachment is used with the harvesting machine and the distance between the pick-up location and the drop location of the curved spout has a first length (L1), is operated in the range of the nominal speed and, when the second attachment is used with the harvesting machine and the distance between the pick-up location and the drop location of the curved spout has a second length (L2), is operated in a speed range reduced relative to the nominal speed, wherein the first working width is greater than the second working width and wherein the first length (L1) is greater than the second length (L2).

2. The self-propelled agricultural harvesting machine according to claim 1, wherein the speed range reduced relative to the nominal speed matches at least approximately a ratio (L2/L1) of the second length (L2) to the first length (L1).

3. The self-propelled agricultural harvesting machine according to claim 2, wherein the control device has sensing means for measuring the distance between the pick-up location and the drop location and is configured to preset the operating speed based on the distance measured by the sensing means.

4. The self-propelled agricultural harvesting machine according to claim 3, wherein the speed range reduced relative to the nominal speed is automatically controlled by the control device based on the distance between the pick-up location and the drop location measured by the sensing means.

5. The self-propelled agricultural harvesting machine according to claim 1, wherein the control device comprises a switching device having switching positions for the idle speed, the nominal speed, and at least one intermediate position for the speed range reduced relative to the nominal speed.

6. The self-propelled agricultural harvesting machine according to claim 1, wherein the speed range reduced relative to the nominal speed is approximately 75% to 85% of the nominal speed.

* * * * *